US012684530B2

(12) United States Patent
Abbas et al.

(10) Patent No.: US 12,684,530 B2
(45) Date of Patent: Jul. 14, 2026

(54) CLIENT DEVICE AND NETWORK NODE FOR SWITCHING POSITIONING PROCEDURES

(71) Applicant: HUAWEI TECHNOLOGIES CO., LTD., Shenzhen (CN)

(72) Inventors: Taimoor Abbas, Munich (DE); Kiseon Ryu, Munich (DE); Gustaf Claeson, Munich (DE); Maria Fresia, Munich (DE); Xingwei Zhang, Kista (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 320 days.

(21) Appl. No.: 18/459,525

(22) Filed: Sep. 1, 2023

(65) Prior Publication Data

US 2023/0413228 A1 Dec. 21, 2023

Related U.S. Application Data

(63) Continuation of application No. PCT/EP2021/055233, filed on Mar. 3, 2021.

(51) Int. Cl.
*H04W 64/00* (2009.01)

(52) U.S. Cl.
CPC ................................. *H04W 64/006* (2013.01)

(58) Field of Classification Search
CPC . H04W 64/00; H04W 64/003; H04W 64/006; G01S 5/0018; G01S 5/0036
See application file for complete search history.

(56) References Cited

U.S. PATENT DOCUMENTS

2012/0196616 A1* 8/2012 Edge ..................... G01S 5/0036
455/456.1
2016/0095080 A1* 3/2016 Khoryaev ............. G01S 5/0284
455/456.1
2020/0229124 A1 7/2020 Soriaga et al.
(Continued)

FOREIGN PATENT DOCUMENTS

WO 2012019055 A1 2/2012
WO WO-2022073619 A1 * 4/2022 .......... H04W 64/003

OTHER PUBLICATIONS

3GPP TS 22.261 V18.1.1 (Jan. 2021), 3rd Generation Partnership Project; Technical Specification Group Services and System Aspects; Service requirements for the 5G system; Stage 1 (Release 18), total 85 pages.

(Continued)

*Primary Examiner* — Siu M Lee
(74) *Attorney, Agent, or Firm* — Rimon PC

(57) ABSTRACT
Embodiments of this disclosure provide for a method and related device for switching between a first and a second positioning procedure. The first positioning procedure may be an absolute positioning procedure and the second positioning may be a relative positioning procedure. The switch may be initiated by a network node which can instruct a client device to terminate the first positioning procedure and to activate the second positioning procedure or to instruct the client device to continue with the first positioning procedure and to activate the second positioning procedure. In this way, the positioning procedure used by the client device is adaptable based on dynamic requirements on positioning procedures set by applications.

20 Claims, 5 Drawing Sheets

500

(56)  References Cited

U.S. PATENT DOCUMENTS

| 2021/0058889 A1 | 2/2021 | Zhang et al. | |
|---|---|---|---|
| 2021/0243720 A1* | 8/2021 | Farag | H04B 7/086 |
| 2022/0248366 A1* | 8/2022 | Bao | H04W 64/006 |
| 2022/0299622 A1* | 9/2022 | Hasegawa | G01S 13/62 |
| 2022/0342086 A1* | 10/2022 | Yoshida | G01S 19/47 |
| 2023/0224121 A1* | 7/2023 | Ganesan | H04L 5/0051 |
| | | | 455/456.1 |
| 2024/0031975 A1* | 1/2024 | Baek | H04W 4/40 |
| 2024/0080862 A1* | 3/2024 | Garcia | H04L 5/0057 |

OTHER PUBLICATIONS

3GPP TS 22.186 V16.2.0 (Jun. 2019), 3rd Generation Partnership Project; Technical Specification Group Services and System Aspects; Enhancement of 3GPP support for V2X scenarios; Stage 1 (Release 16), total 18 pages.

3GPP TS 37.355 V16.3.0 (Dec. 2020), 3rd Generation Partnership Project; Technical Specification Group Radio Access Network; LTE Positioning Protocol (LPP) (Release 16), total 298 pages.

3GPP TS 38.455 V16.2.0 (Jan. 2021), 3rd Generation Partnership Project; Technical Specification Group Radio Access Network; NG-RAN; NR Positioning Protocol A (NRPPa) (Release 16), total 151 pages.

3GPP TS 38.331 V16.3.1 (Jan. 2021), 3rd Generation Partnership Project; Technical Specification Group Radio Access Network; NR; Radio Resource Control (RRC) protocol specification (Release 16), total 932 pages.

3GPP TS 38.321 V16.3.0 (Dec. 2020), 3rd Generation Partnership Project; Technical Specification Group Radio Access Network; NR; Medium Access Control (MAC) protocol specification (Release 16), total 156 pages.

* cited by examiner

500
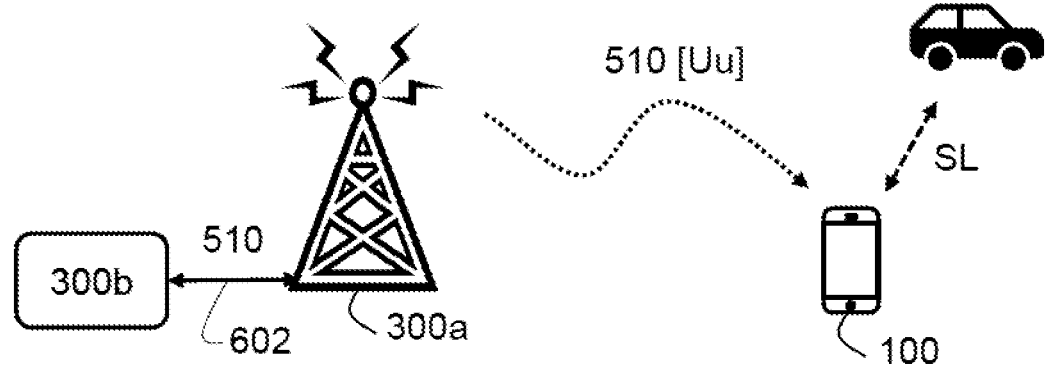
Fig. 5
Absolute position
Relative position
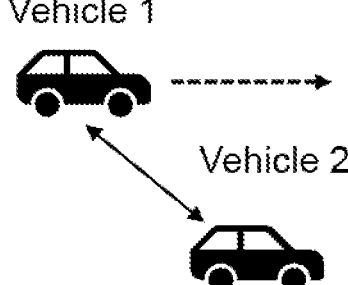
Fig. 6a
Fig. 6b

CLIENT DEVICE AND NETWORK NODE FOR SWITCHING POSITIONING PROCEDURES

CROSS-REFERENCE TO RELATED APPLICATIONS

This application is a continuation of International Application No. PCT/EP2021/055233, filed on Mar. 3, 2021, the disclosure of which is hereby incorporated by reference in its entirety.

TECHNICAL FIELD

The application relates to the field of client devices and network nodes for switching and adapting positioning procedures, and in particular, to corresponding methods and computer programs.

BACKGROUND

The third generation partnership project (3GPP) has been developing solutions for positioning services based on the requirements specified in technical specifications (TS), such as TS 22.261 and TS 22.186. Among the various use cases requiring accurate positioning are vehicle to anything (V2X), autonomous driving, industrial internet of things (IIoT) and public safety. The user equipment (UE) needs to support positioning procedures or methods in these and other use cases for various scenarios including being in-coverage, having partial coverage, and being out-of-coverage.

For advanced use cases, there is a high demand on accurate positioning of the UE. A relative positioning accuracy required between UEs could be as low as 0.1 meters (m) lateral, and 0.5 m longitudinal in various types of environments with or without cellular coverage. Currently both network-based and UE-based radio access technology (RAT) dependent methods are used for accurate position estimation. However, there is a need to mitigate drawbacks with conventional RAT dependent methods to obtain accurate position estimation.

SUMMARY

An objective of embodiments of the disclosure is to provide a solution which mitigates or solves the drawbacks and problems of conventional solutions.

The above and further objectives are solved by the subject matter of the independent claims. Further advantageous embodiments of the disclosure can be found in the dependent claims.

According to a first aspect of the disclosure, the above mentioned and other objectives are achieved with a client device for a communication system, where the client device is configured to activate a first positioning procedure and receive a first control message from a network node. The first control message indicates an instruction to activate a second positioning procedure. The first positioning procedure provides an absolute position of the client device and the second positioning procedure provides a relative position of the client device, or vice versa. The client device is further configured to activate the second positioning procedure upon reception of the first control message.

A positioning procedure herein may also be denoted a positioning method or a positioning solution.

Further, it may also be understood that the client device has the first positioning procedure already activated when the second positioning procedure is activated.

An advantage of the client device according to the first aspect is that a switching mechanism is provided for adaptive switching of positioning procedures in the client device. Further, the client device may perform the second positioning procedure in addition to the first positioning procedure that has been already activated with low latency and with less signaling overhead by reception of the first control message.

In an implementation form of a client device according to the first aspect, the first control message further indicates an instruction to de-activate the first positioning procedure, or continue to have the first positioning procedure active.

An advantage with this implementation form is that the client device may determine whether or not to de-activate the first positioning procedure while activating the second positioning procedure by reception of the first control message.

In an implementation form of a client device according to the first aspect, the absolute position defines a position of an object in a coordinate system and the relative position defines a spatial relationship between two or more objects.

The spatial relationship may be, for example, a lateral and/or a longitudinal relationship between the two or more objects. An object may be a client device such as UE.

In an implementation form of a client device according to the first aspect, the first positioning procedure is an absolute positioning procedure based on Uu measurements and the second positioning procedure is a relative positioning procedure based on sidelink measurements.

An advantage with this implementation form is that the client device may obtain the appropriate position information efficiently by either the absolute position based on Uu measurement or the relative position based on sidelink measurements.

In an implementation form of a client device according to the first aspect, the network node is a Location Management Function, and wherein the first control message is a long-term evolution (LTE) positioning protocol (LPP) message.

An advantage with this implementation form is that it could provide a compatible solution to the specification in the 3GPP standard while defining a simplified implementation.

In an implementation form of a client device according to the first aspect, the LPP message indicates sidelink positioning assistance information comprising a sidelink Transmission/Reception Point (TRP) identifier, a synchronization signal block information of the sidelink TRP, and/or geographical coordinates of the sidelink TRP; a sidelink positioning reference signal configuration; and/or spatial direction information of sidelink positioning reference signal resources.

An advantage with this implementation form is that the client device may obtain information that allows for a measurement of the relative position with sidelink TRPs over the sidelink interface.

In an implementation form of a client device according to the first aspect, the client device is configured to transmit a second control message to the network node prior to the reception of the first control message, where the second control message indicates a request or a preference to activate the second positioning procedure.

An advantage with this implementation form is that the client device may itself initiate the activation procedure of the second positioning procedure by transmitting the second control message to the network node.

In an implementation form of a client device according to the first aspect, the second control message further indicates a request or a preference to de-activate the first positioning procedure, or continue to have the first positioning procedure active.

An advantage with this implementation form is that the client device may inform the network node of its preference about whether or not to de-activate the first positioning procedure while requesting the activation of the second positioning procedure to the network node.

In an implementation form of a client device according to the first aspect, the second control message further indicates one or more identities of sidelink TRPs for the second positioning procedure when being based on sidelink measurements.

An advantage with this implementation form is that the client device may provide the network node with the identity information of sidelink TRPs that the client device intends to measure the relative position with over the sidelink interface.

According to a second aspect of the disclosure, the above mentioned and other objectives are achieved with a network node for a communication system, where the network node is configured to transmit a first control message to a client device having activated a first positioning procedure, where the first control message indicates an instruction to activate a second positioning procedure. The first positioning procedure is an absolute positioning procedure providing an absolute position of the client device and the second positioning procedure is a relative positioning procedure providing a relative position of the client device, or vice versa.

An advantage of the network node according to the second aspect is that a switching mechanism is provided for adaptive switching of positioning procedure in the client device. Further, the network node may instruct the client device to perform the second positioning procedure in addition to the first positioning procedure that has been already activated with low latency and with less signaling overhead by transmission of the first control message.

In an implementation form of a network node according to the second aspect, the first control message further indicates an instruction to de-activate the first positioning procedure, or continue to have the first positioning procedure active.

An advantage with this implementation form is that the network node may instruct the client device about whether or not to de-activate the first positioning procedure while activating the second positioning procedure by transmission of the first control message.

In an implementation form of a network node according to the second aspect, the absolute position defines a position of an object in a coordinate system and the relative position defines a spatial relationship between two or more objects.

In an implementation form of a network node according to the second aspect, the first positioning procedure is an absolute positioning procedure based on Uu measurements and the second positioning procedure is a relative positioning procedure based on sidelink measurements.

An advantage with this implementation form is that the network node may provide the client device with a solution to perform the appropriate positioning procedure among the absolute position based on Uu measurement and the relative position based on sidelink measurement.

In an implementation form of a network node according to the second aspect, the network node is a Location Management Function, and the first control message is an LPP message.

An advantage with this implementation form is that it could provide a compatible solution to the specification in the 3GPP standard while defining a simplified implementation.

In an implementation form of a network node according to the second aspect, the LPP message indicates sidelink positioning assistance information comprising a sidelink TRP identifier, a synchronization signal block information of the sidelink TRP, and/or geographical coordinates of the sidelink TRP; a sidelink positioning reference signal configuration; and/or spatial direction information of sidelink positioning reference signal resources.

An advantage with this implementation form is that the network node may provide the client device with information facilitating for a measurement of the relative position with sidelink TRPs over the sidelink interface.

In an implementation form of a network node according to the second aspect, the network node is configured to receive a second control message from the client device prior to the transmission of the first control message, where the second control message indicates a request or a preference to activate the second positioning procedure.

An advantage with this implementation form is that the network node may determine the appropriate positioning procedure to be activated by the client device upon reception of the second control message from the client device.

In an implementation form of a network node according to the second aspect, the second control message further indicates a request or a preference to de-activate the first positioning procedure, or continue to have the first positioning procedure active.

An advantage with this implementation form is that the network node may determine whether or not the client device should de-activate the first positioning procedure while activating the second positioning procedure.

In an implementation form of a network node according to the second aspect, the second control message further indicates one or more identities of sidelink TRPs for the second positioning procedure when being based on sidelink measurements.

An advantage with this implementation form is that the network node may determine the sidelink TRPs which the relative position over the sidelink needs to be measured by the client device.

According to a third aspect of the disclosure, the above mentioned and other objectives are achieved with a method for a client device comprising activating a first positioning procedure and receiving a first control message from a network node, where the first control message indicates an instruction to activate a second positioning procedure. The first positioning procedure provides an absolute position of the client device and the second positioning procedure provides a relative position of the client device, or vice versa. The method further includes activating the second positioning procedure upon reception of the first control message.

The method according to the third aspect can be extended into implementation forms corresponding to the implementation forms of the client device according to the first aspect. Hence, an implementation form of the method comprises the feature(s) of the corresponding implementation form of the client device.

The advantages of the methods according to the third aspect are the same as those for the corresponding implementation forms of the client device according to the first aspect.

According to a fourth aspect of the disclosure, the above mentioned and other objectives are achieved with a method for a network node comprising transmitting a first control message to a client device having activated a first positioning procedure, where the first control message indicates an instruction to activate a second positioning procedure. The first positioning procedure is an absolute positioning procedure providing an absolute position of the client device and the second positioning procedure is a relative positioning procedure providing a relative position of the client device, or vice versa.

The method according to the fourth aspect can be extended into implementation forms corresponding to the implementation forms of the network node according to the second aspect. Hence, an implementation form of the method comprises the feature(s) of the corresponding implementation form of the network node.

The advantages of the methods according to the fourth aspect are the same as those for the corresponding implementation forms of the network node according to the second aspect.

The disclosure also relates to a computer program, characterized in program code, which when run by at least one processor causes said at least one processor to execute any method according to embodiments of the disclosure. Further, the disclosure also relates to a computer program product comprising a computer readable medium and said mentioned computer program, wherein said computer program is included in the computer readable medium, and comprises of one or more from the group: ROM (Read-Only Memory), PROM (Programmable ROM), EPROM (Erasable PROM), Flash memory, EEPROM (Electrically EPROM) and hard disk drive.

Further applications and advantages of the embodiments of the disclosure will be apparent from the following detailed description.

BRIEF DESCRIPTION OF THE DRAWINGS

The appended drawings are intended to clarify and explain different embodiments of the disclosure.

FIG. 5 shows a communication system according to an embodiment of the disclosure;

FIGS. 6a and 6b illustrates absolute position (AP) and relative position (RP), respectively;

DETAILED DESCRIPTION

Figure 1:
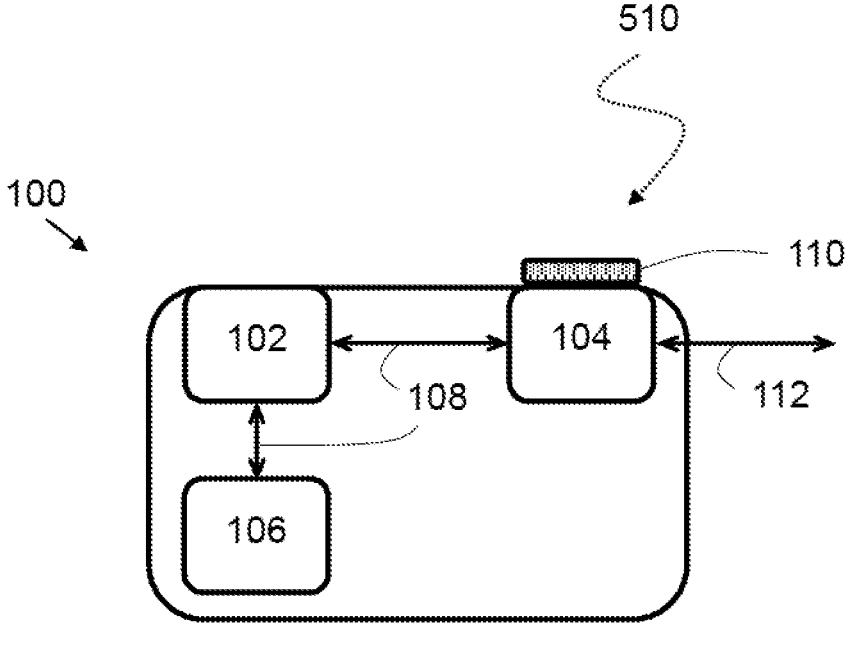
FIG. 1 shows a client device according to an embodiment of the disclosure.

Conventional network-based and UE-based radio access technology (RAT) dependent positioning procedures/solutions/methods rely on Uu communication interface via uplink and downlink communication. This approach limits the applicability of the positioning procedures/solutions/methods to various coverage scenarios. For future applications of utilizing positioning-dependent technology, there is big interest in applying sidelink (SL) positioning, as it offers improved availability and reduced latency. There are multiple options to utilize, such as both Uu and sidelink based positioning for absolute and relative positioning. The positioning could further be network-based or UE-based, network-assisted or UE-assisted, and network-controlled or UE-controlled. Hence, a smart selection or switching between absolute or relative positioning, as well as between Uu and sidelink positioning, is beneficial for improving system efficiency.

Absolute position is a position of an object with regards to a global positioning coordinate system such as global positioning system (GPS)/global navigation satellite system (GNSS) etc. A relative position is the position of an object with regards to another object. Absolute positioning is not always needed as, for some applications and use cases, the relative positioning is sufficient for a system. For example, in a scenario of vulnerable road user (VRU) based clustering, it is sufficient to know the relative position of the UE (VRU) from the cluster head. The absolute position estimation for the cluster head could either be known or be performed in real time by any positioning method. Similarly, for collision avoidance applications, the absolute positioning could be switched off and replaced by the relative positioning, because it is the relative position between the vehicles that is important for avoiding a collision. Relative positioning can further be utilized to improve the accuracy of absolute position of a UE acquired by other means, for example, in cooperative positioning, using non-RAT positioning technologies.

Therefore, embodiments of the disclosure provide a switching mechanism that enables the switching between absolute and relative positioning procedures, as well as between network-based and UE-based positioning procedures, etc. For example, from a Uu based absolute positioning to a sidelink based relative positioning, or a network-based absolute positioning to a UE-based relative positioning, and so forth.

According to embodiments of the disclosure, information elements (IEs), signaling schemes and information indicators may be specified to enable the present dynamic switching. For example, these indicators may be based on application requirements and network usage. Furthermore, signals and information elements may be provided in relation to information flow from location functions such as: location management function (LMF) to next generation node b (gNB), LMF to UE, LMF to TRPs via LTE positioning protocol (LPP), LTE positioning protocol A (LPPa), new radio (NR) positioning protocol (NRPP) or NR positioning protocol A (NRPPa) for various positioning procedures/methods.

FIG. 1 shows a client device 100 according to an embodiment of the disclosure. In the embodiment shown in FIG. 1, the client device 100 comprises a processor 102, a transceiver 104 and a memory 106. The processor 102 is coupled to the transceiver 104 and the memory 106 by communication means 108 known in the art. The client device 100 further comprises an antenna or antenna array 110 coupled to the transceiver 104, which facilitates for the client device 100 to be configured for wireless communication in a wireless communication system. That the client device 100 is configured to perform certain actions in this disclosure may be understood to mean that the client device 100 comprises suitable means, such as for example, the processor 102 and the transceiver 104, to be configured to perform said actions.

The client device 100 in this disclosure includes but is not limited to: a UE such as a smart phone, a cellular phone, a cordless phone, a session initiation protocol (SIP) phone, a wireless local loop (WLL) station, a personal digital assistant (PDA), a handheld device having a wireless communication function, a computing device or another processing device connected to a wireless modem, an in-vehicle device, a wearable device, an integrated access and backhaul node (IAB) such as mobile car or equipment installed in a car, a drone, a device-to-device (D2D) device, a wireless camera, a mobile station, an access terminal, an user unit, a wireless communication device, a station of wireless local access network (WLAN), a wireless enabled tablet computer, a laptop-embedded equipment, an universal serial bus (USB) dongle, a wireless customer-premises equipment (CPE), and/or a chipset. In an Internet of things (IOT) scenario, the client device 100 may represent a machine or another device or chipset which performs communication with another wireless device and/or a network equipment.

The UE may further be referred to as a mobile telephone, a cellular telephone, a computer tablet or laptop with wireless capability. The UE in this context may be, for example, portable, pocket-storable, hand-held, computer-comprised, or vehicle-mounted mobile device that is enabled to communicate voice and/or data, via the radio access network, with another entity, such as another receiver or a server. The UE can be a station (STA), which is any device that contains an IEEE 802.11-conformant media access control (MAC) and physical layer (PHY) interface to the wireless medium (WM). The UE may also be configured for communication in 3GPP-related LTE and LTE-Advanced, in worldwide interoperability for microwave access (WiMAX) and its evolution, and in fifth generation (5g) wireless technologies, such as NR.

The processor 102 of the client device 100 may be referred to as one or more general-purpose central processing units (CPUs), one or more digital signal processors (DSPs), one or more application-specific integrated circuits (ASICs), one or more field programmable gate arrays (FP-GAs), one or more programmable logic devices, one or more discrete gates, one or more transistor logic devices, one or more discrete hardware components, and one or more chipsets. The memory 106 of the client device 100 may be a read-only memory, a random access memory, or a non-volatile random access memory (NVRAM). The transceiver 104 of the client device 100 may be a transceiver circuit, a power controller, an antenna, or an interface which communicates with other modules or devices. In embodiments, the transceiver 104 of the client device 100 may be a separate chipset or being integrated with the processor 102 in one chipset. While in some embodiments, the processor 102, the transceiver 104, and the memory 106 of the client device 100 are integrated in one chipset.

According to embodiments of the disclosure and with reference to the client device 100 in FIG. 1 and the communication system 500 in FIG. 5, the client device 100 is configured to activate a first positioning procedure. The client device 100 is further configured to receive a first control message 510 from a network node 300, where the first control message 510 indicates an instruction to activate a second positioning procedure. The first positioning procedure provides an absolute position of the client device 100 and the second positioning procedure provides a relative position of the client device 100, or vice versa. The client device 100 is further configured to activate the second positioning procedure upon reception of the first control message 510.

Figure 2:
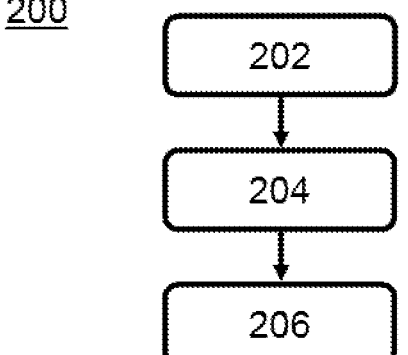
FIG. 2 shows a method for a client device according to an embodiment of the disclosure.

FIG. 2 shows a flow chart of a corresponding method 200 which may be executed in a client device 100, such as the one shown in FIG. 1. The method 200 comprises activating 202 a first positioning procedure. The method 200 comprises receiving 204 a first control message 510 from a network node 300. The first control message 510 indicates an instruction to activate a second positioning procedure. The first positioning procedure provides an absolute position of the client device 100 and the second positioning procedure provides a relative position of the client device 100, or vice versa. The method 200 comprises activating 206 the second positioning procedure upon reception of the first control message 510.

Figure 3:
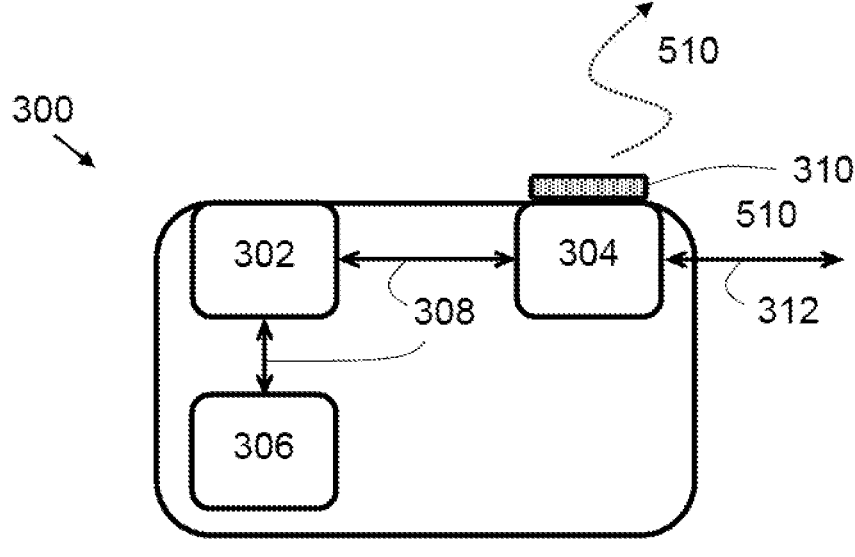
FIG. 3 shows a network node according to an embodiment of the disclosure.

FIG. 3 shows a network node 300 according to an embodiment of the disclosure. In the embodiment shown in FIG. 3, the network node 300 comprises a processor 302, a transceiver 304 and a memory 306. The processor 302 is coupled to the transceiver 304 and the memory 306 by communication means 308 known in the art. The network node 300 may be configured for both wireless and wired communications in wireless and wired communication systems, respectively. The wireless communication capability is provided with an antenna or antenna array 310 coupled to the transceiver 304, while the wired communication capability is provided with a wired communication interface 312 coupled to the transceiver 304. That the network node 300 is configured to perform certain actions in this disclosure may be understood to mean that the network node 300 comprises suitable means, such as, for example, the processor 302 and the transceiver 304, that are configured to perform said actions.

The processor 302 of the network access node 300 may be referred to as one or more general-purpose CPUs, one or more DSPs, one or more ASICs, one or more FPGAs, one or more programmable logic devices, one or more discrete gates, one or more transistor logic devices, one or more discrete hardware components, and one or more chipsets. The memory 306 of the network access node 300 may be a read-only memory, a random access memory, or a NVRAM. The transceiver 304 of the network access node 300 may be a transceiver circuit, a power controller, an antenna, or an interface which communicates with other modules or devices. In embodiments, the transceiver 304 of the network access node 300 may be a separate chipset or being integrated with the processor 302 in one chipset. While in some embodiments, the processor 302, the transceiver 304, and the memory 306 of the network access node 300 are integrated in one chipset.

According to embodiments of the disclosure and with reference to the network node 300 in FIG. 3 and the communication system 500 in FIG. 5, the network node 300 is configured to transmit a first control message 510 to a client device 100 having activated a first positioning procedure. The first control message 510 indicates an instruction to activate a second positioning procedure, and where the first positioning procedure is an absolute positioning procedure providing an absolute position of the client device 100 and the second positioning procedure is a relative positioning procedure providing a relative position of the client device 100, or vice versa.

Figure 4:
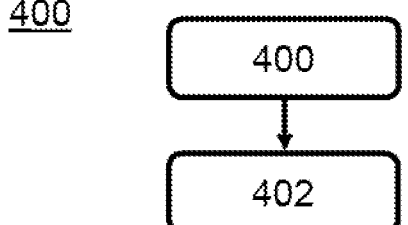
FIG. 4 shows a method for a network node according to an embodiment of the disclosure.

FIG. 4 shows a flow chart of a corresponding method 400 which may be executed in a network node 300, such as the one shown in FIG. 3. The method 400 comprises transmitting 402 a first control message 510 to a client device 100 having activated a first positioning procedure, where the first control message 510 indicates an instruction to activate a second positioning procedure, and where the first positioning procedure is an absolute positioning procedure providing an absolute position of the client device 100 and the second positioning procedure is a relative positioning procedure providing a relative position of the client device 100, or vice versa.

FIG. 5 shows a communication system 500 according to an embodiment of the disclosure. The communication system 500 comprises a client device 100 and a network access node 300*a* of a RAN communicating over a radio interface such as the Uu interface. Further, the network access node 300*a* is in turn communicably coupled via a wired/wireless communication interface 602 to a network node 300*b* of a core network of the communication system 500. Hence, in embodiments of the disclosure, the present network node 300 may be a network access node 300*a* of a RAN or a network node 300*b* of a core network. This implies that the client device 100 may communicate with the RAN and/or core network.

Generally, the herein presented idea in terms of RAT based positioning considering both Uu and sidelink positioning are supported by the cellular network. Efficient adaptation of positioning procedures/methods for dynamic requirements are therefore defined. The switching between relative and absolute positioning, or vice versa, may be achieved in many different ways. For example, absolute positioning or relative positioning, could be completely switched on or off, for example, based on requirements from an application or available resources. On the other hand, absolute positioning or relative positioning, may not completely be switched on or off but adopted to achieve e.g. improved resource utilization.

To transmit the herein defined control messages over the Uu or sidelink interfaces may depend on the use case, for example, proximity, network congestion, network resources, radio resources, power in the UE, application in the UE, etc. It may be foreseen that the initiation of the positioning procedure switching or adoption of the positioning procedure can come from the UE and/or the network, which is defined to enable/disable, or adopt specific configurations for absolute or relative positioning. For the switching/adoption a generalized procedure may be proposed where switching could be done by release or switch commands embedded in different types of communication protocols standardized or non-standardized.

Further, the following non-limiting exemplary scenarios may especially be considered:

Switching from a network-based absolute positioning (AP) to a UE-based relative positioning (RP), where the target UE is in network coverage and the UE initiates a switch request. In this case, a relative position could be estimated using the sidelink based positioning in the UE.

Switching from a network-based Uu absolute positioning to a network-based sidelink relative positioning, where a target UE is in network coverage and a LMF initiates switching from Uu based absolute positioning to sidelink based relative positioning.

Switching from a UE-based absolute positioning to a UE-based relative positioning, where a target UE is potentially in out-of-coverage (OoC) or in partial coverage. The UE may send the change request to the relevant TRPs and updates a positioning procedure from absolute to relative with the TRP of interest.

FIGS. 6*a* and 6*b* illustrates an absolute position and a relative position, respectively, of a client device 100 illustrated as a vehicle in this particular example. It is shown in FIG. 6*a* that a vehicle in the form of a car having an absolute position in a global coordinate system. In this example, a Cartesian coordinate system is utilized. The absolute position may be given by a global positioning coordinate system such as GPS or GNSS. It is further shown in FIG. 6*b* that a first vehicle (Vehicle 1) is about to overtake (dashed arrow) a second vehicle (Vehicle 2). The first vehicle has a relative position in respect to a second vehicle illustrated with the full arrow between the two vehicles. The relative position of the UE may be defined in a relative lateral accuracy and a relative longitudinal accuracy, or any other measures that may be determined by a standard.

Moreover, in the following disclosure, further detailed embodiments of the disclosure will be presented and described. For providing improved understanding of embodiments of the disclosure the embodiments herein presented are set in a 3GPP context hence the terminology, expressions and system architecture used. However, embodiments of the disclosure are not limited thereto and may be implemented in any suitable communication system.

Figure 7:
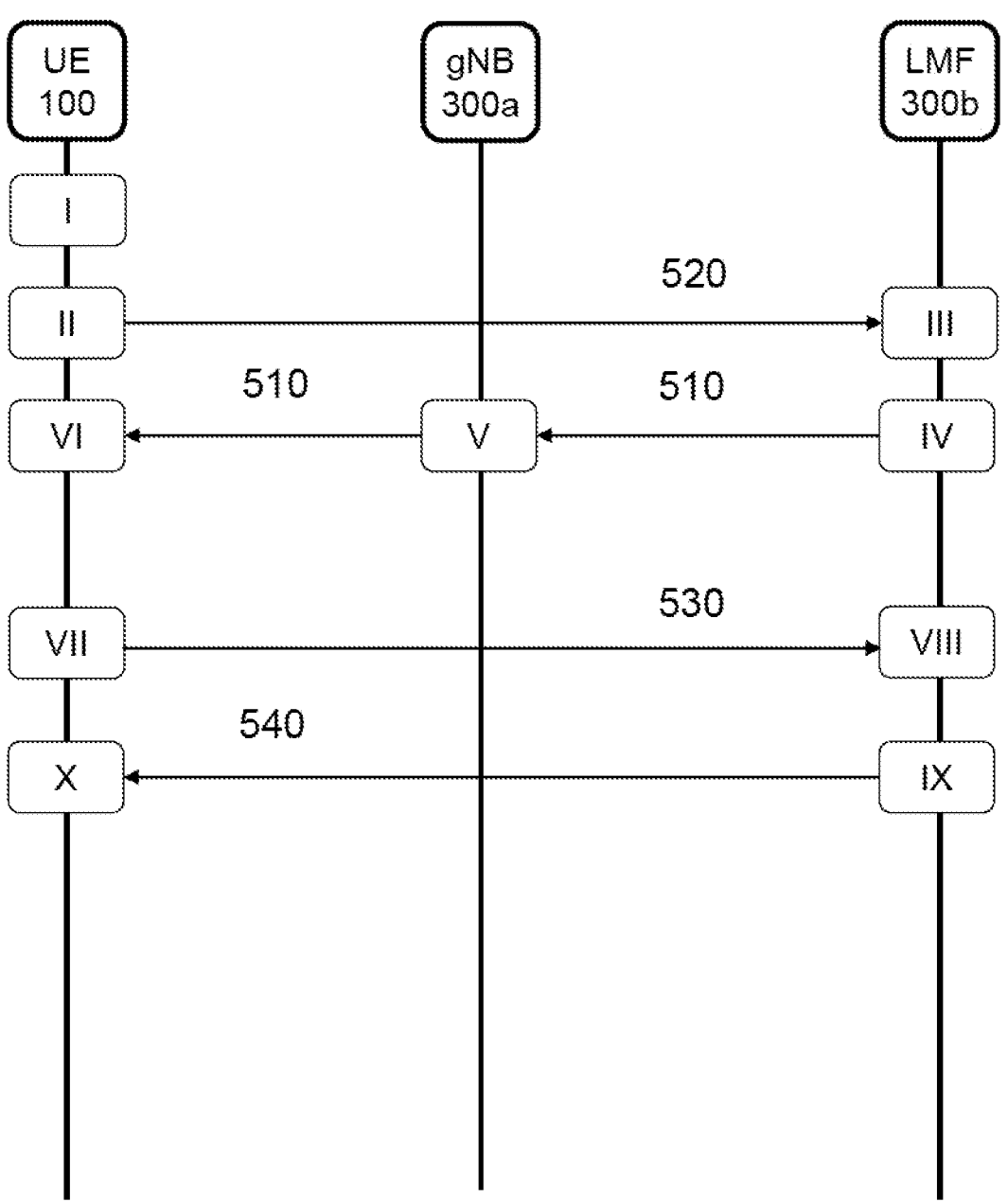
FIG. 7 shows a flow chart of a method for a client device according to an embodiment of the disclosure.

FIG. 7 shows a detailed signaling diagram between UE 100, a gNB 300*a* of a RAN, and a LMF 300*b* of a core network in a communication system 500, such as 3GPP 5G a.k.a. new radio (NR). Hence, in this example, the network node 300 is a Location Management Function (LMF) 300*b* and the first control message 510 may be a LPP message. In such cases, the signaling between the LMF 300*b* of the core network and the UE 100 is performed via a serving gNB 300*a* of the RAN as shown in FIG. 7.

In step I in FIG. 7, a first positioning procedure in the form of absolute positioning has already been activated by the UE. Therefore, the absolute position of the UE may be estimated in the network over the Uu interface/link given that the UE is in network coverage. Typically, it is the LMF in the core network that handles the position estimation of the UE and its related functionality. However, the position could also be estimated in the UE depending on its use cases and scenarios.

In step II in FIG. 7, a switching request for a change of positioning procedure may either be initiated by the LMF or by the UE itself. In the latter case, the switching request may be triggered by an application in the UE, and in such cases, the UE transmits a second control message 520 to the LMF prior to the reception of the first control message 510 as illustrated in FIG. 7. The second control message 520 indicates a request or a preference to activate the second positioning procedure.

In step III in FIG. 7, the LMF receives the second control message 520 from the UE and instigates a location procedure by providing new requirements to the serving gNB, the UE, and to relevant TRPs that may be involved. A TRP may be considered as a target communication device with which the UE intends to measure with for determining positioning via the sidelink interface.

In step IV in FIG. 7, the LMF therefore transmits a LPP message as a first control message 510 to the UE via the gNB. The LPP message provides appropriate configuration of the gNB and the UE and may, in embodiments of the disclosure, indicate the following parameters:

Sidelink positioning assistance information comprising a sidelink Transmission/Reception Point, TRP, identifier, a synchronization signal block (SSB) information of the sidelink TRP (the time/frequency occupancy of SSBs), and/or geographical coordinates of the sidelink TRP;

Sidelink positioning reference signal configuration; and/or

Spatial direction information, e.g. azimuth, elevation etc., of sidelink positioning reference signal resources.

The UE can use these parameters for sidelink positioning. For example, the UE may cooperate with information about one or more TRPs to obtain the position of the UE using the sidelink interface. This configuration of relevant reference signals and spatial direction information provides for accurate and improved signal processing.

There may be three main cases regarding how to handle the first positioning procedure when the second positioning procedure is to be activated or has been activated. In embodiments of the disclosure, the UE continues with the first positioning procedure with an updated configuration for the first positioning procedure. For example, the updated configuration for the first positioning procedure may be comprised in a radio resource control (RRC) message received from the serving gNB. However, in further embodiments of the disclosure, the first control message 510 instead indicates an instruction to de-activate the first positioning procedure or continue to have the first positioning procedure active. Therefore, when it is initiated by the UE, the second control message 520 may further indicate a request or a preference to de-activate the first positioning procedure, or continue to have the first positioning procedure active.

In step V in FIG. 7, the gNB at the reception of the LPP message from the LMF may take appropriate actions such as releasing TRPs, releasing resources engaged in absolute positioning such as sounding reference signal (SRS), adapting applications, and configuring the UE and TRPs for the second positioning procedure. Mentioned resources may be, for example, frequency resources, network resources, etc.

The gNB in embodiments of the disclosure hence terminates the absolute positioning procedure and releases TRPs that have been engaged for the absolute positioning or adopt the absolute positioning with reduced update rates. The gNB may provide sidelink relative positioning configurations to the UE and the TRPs. The relative positioning configurations may be, for example, new RRC configurations indicating:

Release TRPs with Layer 2 identifications (IDs) as above, i.e., gNB via RRC configurations releases TRPs that have been engaged for absolute positioning.

Release SRS resources allocated for absolute positioning.

Configured grant resource allocation mode 1 for sidelink positioning reference signal (SL-PRS) and sidelink positioning sounding reference signal (SL-SRS) which is a new resource.

The above information is used for absolute positioning that is about to be released.

In step VI in FIG. 7, the UE at the reception of the first control message 510 from the LMF via gNB activates the second positioning procedure in the form of a relative positioning that is based on sidelink measurements. In this respect, the UE uses the information in the first control message 510, for example, configuration information about the second positioning procedure.

In step VI in FIG. 7, the UE and its associated TRPs switch to relative positioning over the sidelink interface. This may mean that the UE and the TRPs initiates and engages in sidelink positioning measurements with each other according to configuration information about the second positioning procedure.

In step VII in FIG. 7, if the UE determines after a time period to terminate the activated second positioning procedure, a third control message 530 may be sent from the UE to the LMF via the serving gNB. For example, the UE may determine to terminate the second positioning procedure if certain criteria in an application or use case is met.

In step VIII in FIG. 7, the LMF at the reception of the third control message 530 prepares a fourth control message 540 in response to the reception of the third control message 530.

In step IX in FIG. 7, the LMF transmits the fourth control message 540 to the UE via the serving gNB. The fourth control message 540 may be a LPP message and include an instruction to de-activate the second positioning procedure. The fourth control message 540 may further instruct the UE to re-activate the first positioning procedure.

In step IX in FIG. 7, the UE receives the fourth control message 540 from the LMF and initiates to de-activate the second positioning procedure and may possibly re-activate the first positioning procedure if it is instructed to do so. Hence, the UE and the LMF may return to Uu based positioning.

Figure 8:
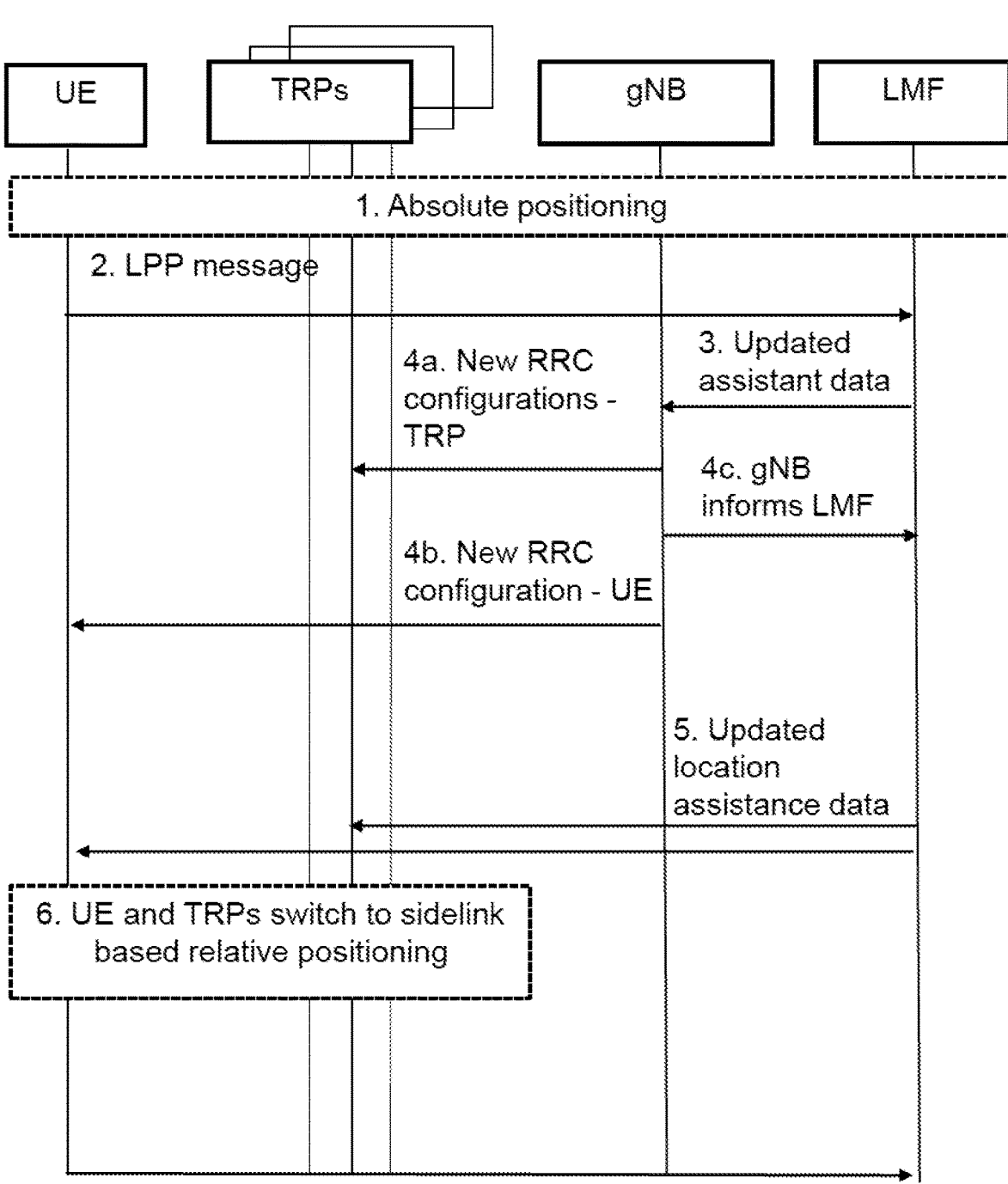
FIG. 8 shows signaling from a network node according to an embodiment of the disclosure.

FIG. 8 illustrates yet further examples of the disclosure to elaborate the present solutions even further.

In 1 in FIG. 8, absolute positioning (AP) based on Uu measurements is active in the UE when the UE is in network coverage.

In 2 in FIG. 8, the UE identifies a change of positioning requirements. In other words, switching from absolute positioning to relative positioning and initiate a request to LMF via a LPP "location service update request" in a second control message 520. This request may further include an indicator to switch from the absolute positioning to the relative sidelink positioning and identities (IDs) of TRPs to which a position will be estimated. In other words, the second control message 520 may indicate one or more identities of sidelink TRPs for the second positioning procedure when being based on sidelink measurements.

In 3 in FIG. 8, after having received the second control message 520 in the form of a LPP message from the UE, the LMF instigates a location positioning procedure with the serving gNB and the TRPs, for example, UEs or road side units (RSUs), for UE-based sidelink relative positioning. If a previously activated UL-SRS should be deactivated, the LMF may send a NR positioning protocol a (NRPPa) positioning deactivation message to the serving gNB of the UE to request a deactivation. This message includes an indication of the UL-SRS resource set to be deactivated. The LMF can also provide updated assistance data for positioning to the serving gNB indicating the deactivation of the UL SRS resource set for the UE, and the LMF can also provide information about one or more target TRP's, e.g., layer 2 IDs, for which a relative position needs to be measured. Hence, the serving gNB is informed by the LMF to terminate absolute positioning and provides sidelink relative positioning configurations. The gNB is also informed whether relative positioning is over the Uu or sidelink interfaces.

In 4 in FIG. 8, a general signaling procedure between the LMF, serving gNB, TRPs, and UE is performed. For sidelink relative positioning, the serving gNB issues new defined RRC configurations for UE and TRPs for configured grant resource allocation mode 1 for SL-PRS/SL-SRS.

In 4a in FIG. 8, the gNB releases SRS resources for Uu, and TRPs used for Uu absolute positioning by transmitting new RRC configurations to the TRPs.

In 4b in FIG. 8, for sidelink relative positioning, the gNB issues a new RRC configurations to the UE, i.e. termination of SRS configuration for Uu.

In 4c in FIG. 8, the gNB informs the LMF about the change of positioning procedure and configuration, such as allocated resources.

In 5 in FIG. 8, the LMF also instigates a change of a positioning procedure with the UE and TRPs to indicate the termination or change of a periodicity of position measurements data to LMF for the absolute positioning via the LPP messages. The LMF may also transfer location assistance data to the UE, which assists the UE to improve the relative positioning over the sidelink interface.

In 6 in FIG. 8, the UE and the associated TRPs switch to UE-based sidelink relative positioning (RP), while the assistance data is provided by the LMF as well as by the TRPs.

In 7 in FIG. 8, the UE via a LPP message, also denoted the fourth control message 540, provides indication to the LMF if it switches back to Uu-based or UE-based absolute positioning. For example, when leaving a cluster of UEs or if power of the UE power is low, etc.

Embodiments of disclosure may e.g. impact the following 3GPP technical specifications (TS):

TS 37.355—for LPPa protocol is specified only for Uu, hence sidelink positioning aspects have to be added to this technical specification;

TS 38.455—NRPPa protocol is specified only for Uu, hence sidelink positioning aspects have to be added to this technical specification;

TS 38.331—PC5 RRC does not include any positioning configurations, and Uu RRC does not include sidelink positioning configuration, hence sidelink positioning aspects have to be added to this technical specification; and TS 38.321 (MAC)—for lower layer signaling such medium access control (MAC) control element (CE). The MAC protocol does not specify any configuration for sidelink positioning reference signaling, hence activation and de-activation of configured semi-persistent sidelink positioning reference signal resource sets have to be added to this technical specification.

The client device 100 herein, may be denoted as a user device, User Equipment (UE), a mobile station, an internet of things (IoT) device, a sensor device, a wireless terminal and/or a mobile terminal that is enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an IEEE 802.11-conformant Media Access Control (MAC) and Physical Layer (PHY) interface to the Wireless Medium (WM). The UE may also be configured for communication in 3GPP related LTE and LTE-Advanced, in WiMAX and its evolution, and in fifth generation wireless technologies, such as New Radio.

The network node 300 may be a network node of a core network and may be denoted a LMF, as defined by the 3GPP standard. The LMF may be a function configured for communication in 3GPP fifth generation wireless technologies, such as new radio (NR).

Furthermore, any method according to embodiments of the disclosure may be implemented in a computer program, having code means, which when run by processing means, causes the processing means to execute the steps of the method. The computer program is included in a computer-readable medium of a computer program product. The computer readable medium may comprise essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, it is realized by the skilled person, that embodiments of the client device 100 and the network node 300 comprises the necessary communication capabilities in the form of functions, means, units, elements, etc., for performing the solution. Examples of other such means, units, elements and functions are: processors, memory, buffers, control logic, encoders, decoders, rate matchers, de-rate matchers, mapping units, multipliers, decision units, selecting units, switches, interleavers, de-interleavers, modulators, demodulators, inputs, outputs, antennas, amplifiers, receiver units, transmitter units, DSPs, MSDs, TCM encoder, TCM decoder, power supply units, power feeders, communication interfaces, communication protocols, etc., which are suitably arranged together for performing the solution.

Especially, the processor(s) of the client device 100 and the network node 300 may comprise, e.g., one or more instances of a Central Processing Unit (CPU), a processing unit, a processing circuit, a processor, an Application Specific Integrated Circuit (ASIC), a microprocessor, or other processing logic that may interpret and execute instructions. The expression "processor" may thus represent a processing circuitry comprising a plurality of processing circuits, such as, any, some or all of the ones mentioned above. The processing circuitry may further perform data processing functions for inputting, outputting, and processing of data comprising data buffering and device control functions, such as call processing control, user interface control, or the like.

Finally, it should be understood that the disclosure is not limited to the embodiments described above, but also relates to and incorporates all embodiments within the scope of the appended independent claims.

What is claimed is:

1. A client device for a communication system, the client device comprising at least one processor and being configured to:

activate a first positioning procedure;

receive a first control message from a network node, wherein the first control message indicates an instruction to activate a second positioning procedure, wherein the first positioning procedure provides an absolute position of the client device and the second positioning procedure provides a relative position of the client device, or the first positioning procedure provides a relative position of the client device and the second positioning procedure provides an absolute position of the client device, wherein a second control message, indicating a request to activate the second positioning procedure, is transmitted to the network node prior to the reception of the first control message; and activate the second positioning procedure upon reception of the first control message.

2. The client device according to claim 1, wherein the first control message further indicates an instruction to:

de-activate the first positioning procedure, or continue having the first positioning procedure be active.

3. The client device according to claim 1, wherein the absolute position defines a position of the client device in a coordinate system and the relative position defines a spatial relationship between the client device and one or more objects.

4. The client device according to claim 1, wherein the first positioning procedure is an absolute positioning procedure based on Uu measurements and the second positioning procedure is a relative positioning procedure based on sidelink measurements.

5. The client device according to claim 1, wherein the network node is a Location Management Function, and wherein the first control message is a long term evolution (LTE) positioning protocol (LPP) message.

6. The client device according to claim 5, wherein the LPP message indicates at least one of:

sidelink positioning assistance information comprising at least one of a sidelink Transmission/Reception Point (TRP) identifier, a synchronization signal block information of the sidelink TRP, or geographical coordinates of the sidelink TRP;

a sidelink positioning reference signal configuration; or spatial direction information of sidelink positioning reference signal resources.

7. The client device according to claim 1, wherein the second control message further indicates a request to:

de-activate the first positioning procedure, or continue having the first positioning procedure be active.

8. The client device according to claim 1, wherein the second control message further indicates one or more identities of sidelink TRPs for the second positioning procedure when being based on sidelink measurements.

9. A network node for a communication system, the network node comprising at least one processor and being configured to:

transmit a first control message to a client device having activated a first positioning procedure, wherein the first control message indicates an instruction to activate a second positioning procedure, wherein the first positioning procedure is an absolute positioning procedure providing an absolute position of the client device and the second positioning procedure is a relative positioning procedure providing a relative position of the client device, or the first positioning procedure provides a relative position of the client device and the second positioning procedure provides an absolute position of the client device, and wherein a second control message, indicating a request to activate the second positioning procedure, is transmitted to the network node prior to the reception of the first control message.

10. The network node according to claim 9, wherein the first control message further indicates an instruction to:

de-activate the first positioning procedure, or continue having the first positioning procedure be active.

11. The network node according to claim 9, wherein the absolute position defines a position of the client device in a coordinate system and the relative position defines a spatial relationship between the client device and one or more objects.

12. The network node according to claim 9, wherein the first positioning procedure is an absolute positioning procedure based on Uu measurements and the second positioning procedure is a relative positioning procedure based on sidelink measurements.

13. The network node according to claim 9, wherein the network node is a Location Management Function, and wherein the first control message is a LPP message.

14. The network node according to claim 13, wherein the LPP message indicates at least one of:

sidelink positioning assistance information comprising at least one of a sidelink TRP identifier, a synchronization signal block information of the sidelink TRP, or geographical coordinates of the sidelink TRP;

a sidelink positioning reference signal configuration; or spatial direction information of sidelink positioning reference signal resources.

15. The network node according to claim 9, wherein the second control message further indicates a request to:

de-activate the first positioning procedure, or continue having the first positioning procedure be active.

16. The network node according to claim 9, wherein the second control message further indicates one or more identities of sidelink TRPs for the second positioning procedure when being based on sidelink measurements.

17. A method for a network node, the method comprising:

transmitting a first control message to a client device having activated a first positioning procedure, wherein the first control message indicates an instruction to activate a second positioning procedure, wherein the first positioning procedure is an absolute positioning procedure providing an absolute position of the client device and the second positioning procedure is a relative positioning procedure providing a relative position of the client device, or the first positioning procedure provides a relative position of the client device and the second positioning procedure provides an absolute position of the client device, and wherein a second control message, indicating a request to activate the second positioning procedure, is transmitted to the network node prior to the reception of the first control message.

18. A non-transitory computer-readable storage medium, wherein the computer-readable storage medium stores a computer program, and when the computer program is executed by a processor, the method according to claim 17 is implemented.

19. The method of claim 17, wherein the second control message further indicates a request to:

de-activate the first positioning procedure, or continue having the first positioning procedure be active.

20. The method of claim 17, wherein the second control message further indicates one or more identities of sidelink TRPs for the second positioning procedure when being based on sidelink measurements.

* * * * *